United States Patent [19]

Gast et al.

[11] 4,392,632

[45] Jul. 12, 1983

[54] ELECTROMAGNETIC VALVE WITH A PLUG MEMBER COMPRISING A PERMANENT MAGNET

[75] Inventors: Theodor Gast, Berlin; Kurt Binder, Stuttgart, both of Fed. Rep. of Germany

[73] Assignee: Robert Bosch GmbH, Fed. Rep. of Germany

[21] Appl. No.: 279,822

[22] Filed: Jul. 2, 1981

[30] Foreign Application Priority Data

Jul. 10, 1980 [DE] Fed. Rep. of Germany ....... 3026133

[51] Int. Cl.³ .............................................. F16K 31/08
[52] U.S. Cl. ..................................... 251/65; 251/137; 251/333; 251/360
[58] Field of Search ................... 251/65, 137, 333, 360

[56] References Cited

U.S. PATENT DOCUMENTS

| | | | |
|---|---|---|---|
| 2,912,008 | 11/1959 | Blackburn | 251/137 X |
| 2,983,278 | 5/1961 | Heintz | 251/137 X |
| 3,812,841 | 5/1974 | Isaacson | 251/65 X |
| 3,814,376 | 6/1974 | Reinicke | 251/65 |
| 4,114,648 | 9/1978 | Nakajima et al. | 251/137 X |

FOREIGN PATENT DOCUMENTS 1186300 2/1970 United Kingdom ................... 251/65

*Primary Examiner*—Arnold Rosenthal
*Attorney, Agent, or Firm*—Frishauf, Holtz, Goodman & Woodward

[57] ABSTRACT

An axially magnetized cylindrical permanent magnet has a valve plug projection at one end for seating in a valve seat. It moves axially within a cavity, provided by two cup cores of ferromagnetic material, which is bisected by a medium ring that has an aperture allowing the permanent magnet to slide within it. Each cup core has a re-entrant central pole, one of which carries the valve seat and is bored to provide one valve port. Windings between the re-entrant poles and the core shells are concurrently energized in such a way as to produce like poles at the re-entrant pole faces, so that one will repel the permanent magnet and the other will attract it. A pulse of current is sufficient to open or close the valve and may be followed by a reverse pulse to brake the plug in order to reduce wear. The permanent magnet force holds the plug in either end positon when there is no current.

9 Claims, 4 Drawing Figures

ELECTROMAGNETIC VALVE WITH A PLUG MEMBER COMPRISING A PERMANENT MAGNET

This invention concerns an electromagnetic valve in which a plug having a round surface moves to and from a valve seat having a round surface.

Magnetically actuated valves are known in which a spherical or conical plug is pressed by a spring against a valve seat, so that when the plug is seated a tight closure can be produced to interrupt flow through the valve. In order to restart the flow through the valve, the ball or cone is pulled from the seat against the force of the spring by means of a plate of ferromagnetic material connected to the valve plug and attracted by an electromagnet. The flow continues so long as the electromagnet holds the plate attracted to it. Although such valves have already gone through a long development time, they are still beset by disadvantages inherent in their nature which are therefore not to be removed by changes in construction. They basically have a substantial lag or dead time, as can be gathered from the diagram of FIG. 2 annexed hereto, which shows the course of the voltage, the current, and the attractive force of the electromagnet and the acceleration, speed and displacement distance of the movable plug.

If at the moment t=0 a constant voltage U is applied to the magnet coils, as usually occurs in practical application, the current rises according to an exponential function $$I = I_{max}(1 - e^{-t/\tau})$$

up to a maximum value $I_{max} = U/R$, where R is the ohmic resistance of the coil and $\tau$ is its time $\tau = L/R$, where L is the self-inductance of the coil.

In this operation, the attractive force rises from zero approximately according to a function $$F = kI^2/l,$$

wherein l is the gap width and k is a constant related to the iron cross-section and the number of turns in the coil, the magnetic reluctance in the iron being neglected. At the moment $t_1$, the magnetic attraction force reaches the value of the spring force $F_f$ multiplied by the pressure force and the ball plug is then raised. The pressure force is given by $$F_p = p \cdot A$$

where A is the effective surface. From this moment on, the spring force increases linearly and the attraction force increases more than proportionately, as the flow now increases on the one hand, while on the other hand the air gap decreases. Upon a short displacement the pressure force is reduced. At the upper mechanical stop, the maximum attraction force is reached, which occurs at the moment $t_2$. If at the moment $t_3$ the voltage is switched off, and if a reverse bypass diode is provided, the current normally falls exponentially. During the travel of the ball plug, the time constant now increases, because the air gap increases. The attraction force decreases proportionately to the square of the current and likewise to the reciprocal of the air gap, so that the ball moves with acceleration towards the seat, which it touches at the moment $t_4$. Shortly before contact, the counter-pressure p of the fluids begins again to build up.

From this consideration it is evident that substantial delay times occur in opening and closing. These are uncertain to the extent that the operating voltage, ohmic resistance of the coil and counter-pressure fluctuate.

Furthermore, the attraction force must be maintained during the opening time by a current flow, with the result that appreciable power losses occur.

The Invention. It is an object of this invention to provide a magnetically operated valve in which the plug has a working surface in the shape of a surface of revolution about an axis along which the plug is moved in opening and closing the valve, the surface of revolution having a diameter that decreases towards the end of the plug that first penetrates into the valve orifice, preferably a spherical plug, which can be actuated electromagnetically for opening and closing a fluid flow orifice, and particularly one which will not require a spring and one that can be opened and closed by pulses without requiring long continued flow of current to maintain the valve in either end position.

Briefly, the plug comprises a permanent magnet and the actuating device comprises a coil or coils set in opposed "pot" or "cup" cores with re-entrant poles in one of which the valve seat is provided. An axially magnetized permanent magnet moves between the poles while its mid-portion slides by a ring of which the outside joins the cup cores. The winding is connected so as to produce like poles in the re-entrant parts of the cores. The permanent magnet bears a round closure body on one end for fitting against the valve seat. A pulse current in one direction opens the valve and a pulse in the other direction closes it.

It is not necessary for the valve closure portion of the plug to be made of magnetic material and permanently magnetized although that is one way of practicing the invention, and it is preferred for the permanent magnet to be of cylindrical shape and to move axially between the poles on the respective bottoms of the two mutually facing cup cores.

This arrangement has the advantage that no spring is necessary because the magnetic attraction force in the closed position of the valve is sufficient to withstand considerable fluid pressure, even when the current in the coil is shut off, because the permanent magnet in its closed magnetic path holds firmly to its position. Likewise in the opened condition, the force of the permanent magnet maintains the valve in position. In consequence, it is sufficient to provide current pulses to switch the valve from one position to the other, with the result that the energy requirements are greatly reduced.

Furthermore, if the valve seat is made adjustable axially, as by providing it on the end of a tubular body that can be screwed into one of the cup cores of the electromagnetic structure, the force holding the valve in closed condition can be adjusted so that it is just sufficient to meet some required value. By such an adjustment, the current necessary to replace the valve plug from the closed position of the valve can be reduced to a minimum and the delay time of opening thereby reduced also.

A further advantage is that in order to avoid excessive impact forces of the plug on the valve seat or on its opposite stop, the current direction can be reversed after the plug has traveled half of its path, so as to brake the plug before it reaches its end position. By the choice of the amplitude and duration of the driving and braking pulses, the opening and closing actions of the valve can be optimized, particularly with respect to the time required for the operation.

If the spherical working portion of the plug is made of hard magnetic material so that it can itself be permanently magnetized, it is desirable that the valve seat should be made of magnetically soft material. The Drawings. The invention is further described by way of illustrative example, with reference to the annexed drawings, in which.

DESCRIPTION OF THE ILLUSTRATED EMBODIMENT

Figure 1:
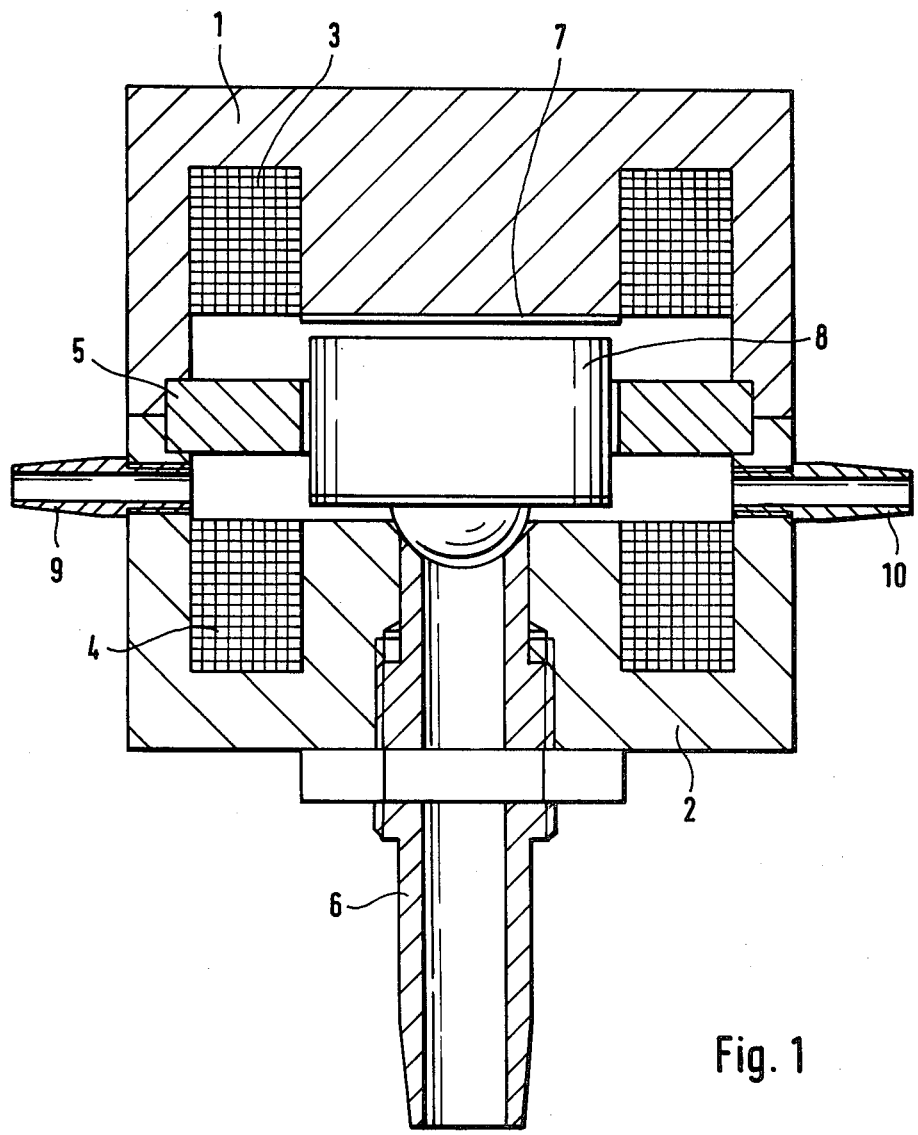
FIG. 1 is a schematic cross-section of a magnetic valve according to the invention on a plane passing through the axis of the magnetic valve.
Figure 2:
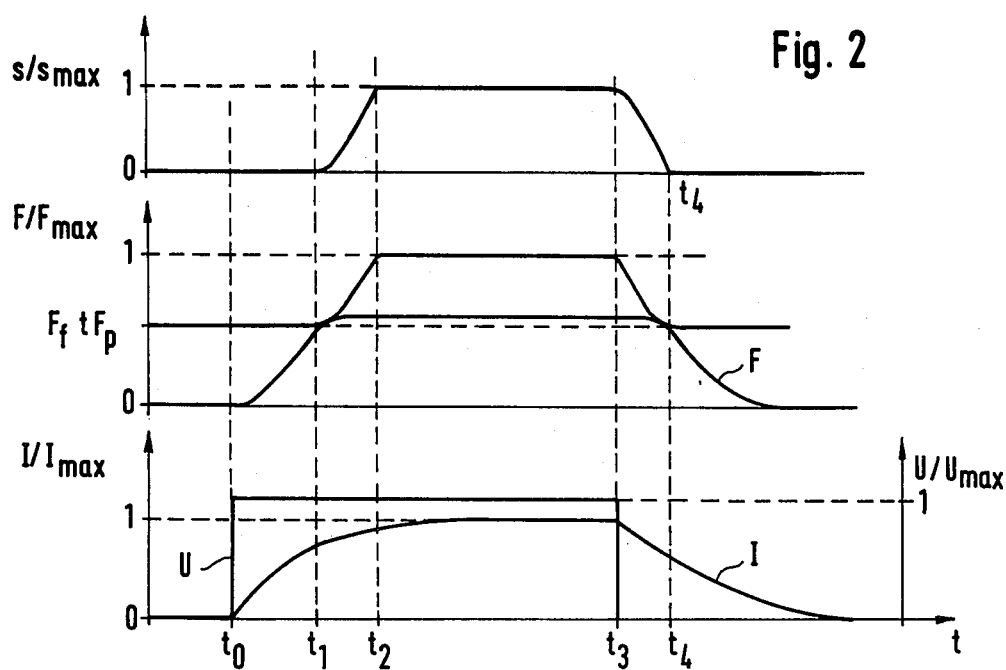
FIG. 2 is a graph illustrating the operating characteristics of the valve.

As shown in FIG. 1, the cup cores 1 and 2 having re-entrant poles 11 and 12 extending from the middle of the bottom of the cup, are made of ferromagnetic material, preferably having high saturation inductance. They enclose coils 3 and 4 that are so connected that a current flowing through both of them when both are in the circuit produces poles of the same polarity at the plane tips of the re-entrant poles 11 and 12. The magnetic lines of force go from these re-entrant poles through the bottom of the cup, through the shell around the outside of the coil and return to the pole around the coil. For concentrating the lines of force, a ring 5 is provided centered on the median plane between the cup cores and made of the same ferromagnetic material as the cup cores. It is provided with a thin layer of a material of low frictional coefficient on its inner cylindrical surface.

The lower cup core 2 has an axial threaded bore into which is screwed a tubular body 6 that by means of its upper surface serves as the valve seat.

The inward-facing pole surface of the pole 11 of the cup core 1 carries a thin plate 7 of non-magnetic material. In the cavity between the poles 11 and 12 of the cup cores, passing through the aperture of the ring 5, an axially permanently magnetized cylinder 8, preferably made of cobalt-samarium alloy, is provided. It carries beneath it a disk of steel with a convex boss in the middle, preferably of hemispherical shape, which is pressed into a tight closure in the valve seat when the cylinder 8 is in its lower position. In this position the plane surface of the disk 14, which in the illustrated case is integral with the hemisphere 15, is only slightly spaced from the surface of the pole 12 of the cup core 2 (the spacing is exaggerated in the drawing).

To complete the valve, above the winding 4 of the lower cup core 2, there are provided inlet and outlet tubes 9 and 10 through which, in the illustrated case a fluid is continuously caused to flow through the intermediate cavity to provide a flow that is tapped by the opening of the valve. It is to be understood, of course, that either the inlet 9 or the outlet 10 could be omitted to provide a valve that simply interrupts the flow, but the example illustrated is a valve configuration particularly useful for operation in a hydraulic system where a hydraulic liquid medium is caused to flow continuously under the driving force of a circulating pump.

The manner of operation of the electromagnetic actuation of the valve is as follows. Let it be assumed that the upper surface of the permanent magnet 8 is its north pole and the bottom surface there of is its south pole. If now current is caused to flow through the coils 3 and 4, so that the facing poles 11 and 12 are both north poles, the magnet will be moved down to close the valve as the north pole of the permanent magnet 8 is attracted by the south pole produced at the pole face of the pole 12 and is repelled by the north pole produced at the bottom surface of the pole 11. The magnetic circuit around the coil 4 is closed by a continuous path of magnetically permeable material, except for the thin annular gap where the permanent magnet 8 slides in the ring 5, which is magnified in FIG. 1 for purposes of illustration. If the current in the coils is switched off, the magnetic lines of force through this essentially closed magnetic circuit holds the valve closed with considerable force.

If now a pulse of current is produced in the opposite direction, the poles 11 and 12 become south poles and the magnet 8 is repelled from below and attracted from above, so that it moves to its upper position against the non-magnetic sheet 7 which produces a small gap in the magnetic path so as to reduce the force necessary to move the magnet 8 away from its upper position when it is desired to close the valve again. The magnetic path is sufficiently closed, however, for the magnet 8 to be maintained in its upper position by magnetic forces when the current in the coils is turned off.

The symmetry of the ring 5 is such that when the magnet 8 is in its middle position, the ring is centered on the plane of symmetry of the magnetic field. For the currentless condition of the coils, no force is exerted on the magnet. It is then in labile equilibrium. If the magnet 8 moves towards one of the poles 11 and 12, the attraction force is increased on this side, while it is reduced on the opposite side. When the air gap at the approached pole becomes small, the attraction force reaches a very high value which can be calculated from the magentic flux passing through the pole face of the permanent magnet 8 where the following relation holds:

$$F=0.5B_L^2A/\mu_0$$

In this expression, $B_L$ is the air gap induction, A the cross-sectional area, $\mu_0$ the permeability of vacuum.

Figure 3:
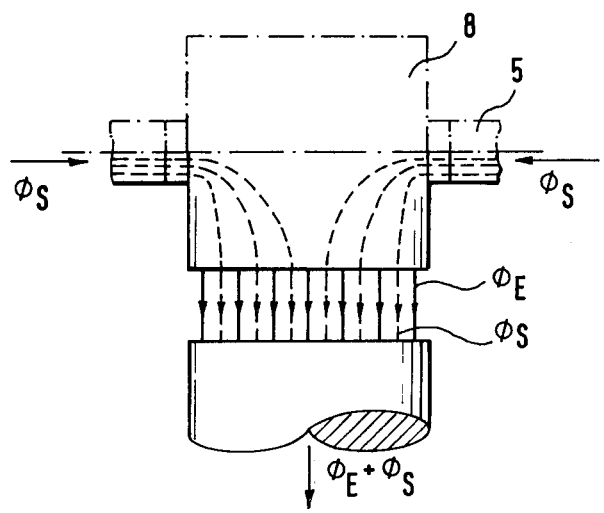
FIG. 3 is a magnetic flux diagram for a portion of the valve of FIG. 1.

If we then set $B_L$ at the induction value 1 T, which can be realized today, and consider an available cross-sectional area of 0.5 cm$^2$, which can be expressed as $0.5\cdot10^{-4}$m$^2$, we then obtain $F=0.5\cdot1.0\cdot0.5\cdot10^{-4}/1.26\cdot10^{-6}\approx20$N. The relation p=F/A between the pressure p, which is the greatest against which the valve can still provide a tight closure, the holding force F and the effective surface A of the plug body can serve to calculate p. For a contact zone of the sphere of 4 mm in the valve seat, the effective surface is 0.13 cm$^2$. The calculated force thus has a pressure of $$20N/10:0.13 \text{ cm}^2 \approx 15 \text{ bar}$$

for the condition of equilibrium. In order to estimate the effect of the windings of the magnet, we consider by way of simplification only the half of the system below the plane of symmetry. FIG. 3 shows the result of this consideration. The flux $\beta$ $\phi_s$ produced by the coil goes into the cylindrical surface of the magent 8 and comes out at its bottom flat surface. There is superimposed thereon the permanent magnet flux $\phi_E$ and the two together exert the force given by $$F = C_1(\phi_E + \phi_S)^2 - C_1\phi_E^2 = C_1(\phi_S^2 + 2\phi_E\phi_S)$$

where $C_1$ is a constant.

This takes account of the fact that the reversible permeability of the permanent magnet is practically equal to 1.

If we now take into account the upper half of the system, quadratic terms disappear when the polarities of the coils are opposite to each other, whereas the cross products are doubled.

$$F = 4C_1\phi_E\phi_S$$

where $C_1 = A/\mu_0$.

Here, $\phi_S$ designates the flux produced by each coil in the middle position of the magnet. If the magnet moves, the fluxes in the two halves of the magnetic system change in opposite directions, so that—at least to a first approximation—the sum remains constant. In comparison with the known magnetic valves, the advantages already described are obtained, namely that the magnetic attraction in the closed position of the valve is sufficient to hold the valve closed, even after the current in the coil is shut off and, likewise, in the open position, the attraction of the permanent magnet is sufficient to maintain the position, thus dispensing with the necessity for a spring and making the valve controllable by pulses provided at the time of each change of position. Furthermore, advancing or withdrawing the tube 6 carrying the valve seat in the threaded bore of the lower cup core can adjust the holding force in the closed condition to an operational minimum value, in order to reduce the amount of current necessary to open the valve and to reduce the delay in opening.

Figure 4:
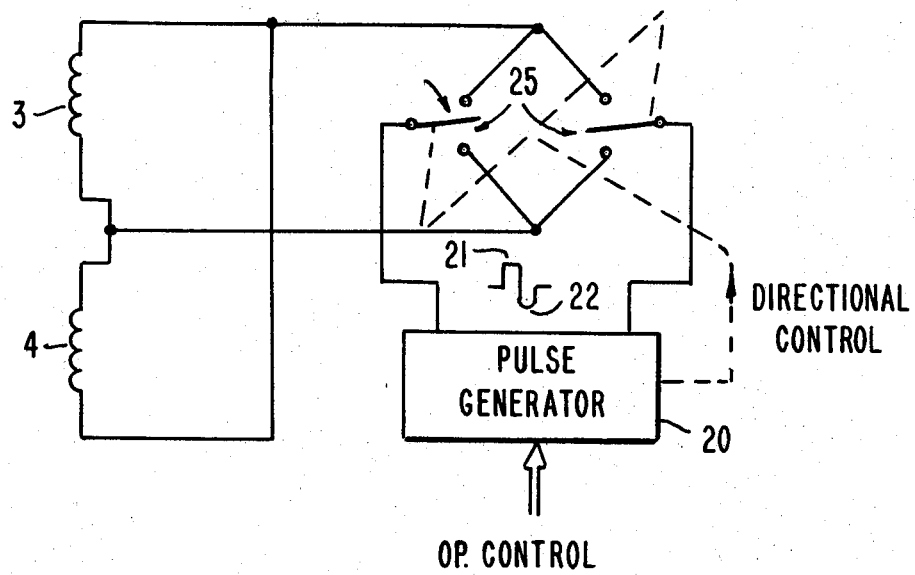
FIG. 4 is a diagram of a circuit for operation of the magnetic valve of FIG. 1.

Finally, it is possible to reverse the current during the latter portion of the travel of the permanent magnet in order to provide braking, especially during closure, in order to reduce wear and damage to the closure surfaces. By the choice of amplitude and duration of the direct and reverse pulses, the opening and closing operations can be optimized with regard to the time characteristics of the operation. FIG. 4 shows a pulse generator 20 which will produce a driving pulse 21 followed by an oppositely directed smaller braking pulse 22 to switch the valve. The dpdt switch 25 determines the direction of operation (i.e., open or close) and, of course, is normally provided in the form of four coordinated semiconductor switches. The switch 25 and the pulse generator can be controlled by a simple spdt switch (not shown).

A sphere of hard magnetic material, polarized in the direction of the axis of the valve, could, as already suggested, be used as a valve plug—in which case the valve seat should consist of soft magnetic material so that it will be drawn into the magnetic flux while the pole of the magnet 8 above it should have a cavity fitting the sphere so that a firm connection will be made by magnetic force permitting the sphere to be withdrawn by the magnet 8.

Although the invention has been described in detail with reference to a particular illustrative embodiment, it will be understood that other variations and modifications are possible within the inventive concept.

We claim:

1. An electromagnetic valve capable of being put into either of two positions by a pulse of current and requiring no flow of current to maintain it in either of said positions, comprising:

first and second cup cores (1,2) each having a reentrant axial pole portion, said cores being mounted facing each other co-axially with their rims joining each other to enclose a cavity, said re-entrant pole portions respectively having inner end faces facing each other across said cavity, said second cup core (2) having an axial bore passing through the re-entrant pole portion of said second cup core and extending to the exterior and having a valve seat provided with a seat surface in the shape of a surface of revolution coaxial with said cores and located in the internal orifice of said bore adjacent to said cavity; said cavity having at least one duct connection (9,10) to the exterior in addition to said bore;

a valve plug constituted by a body comprising a permanent magnet and having a closure surface facing said valve seat permitting engagement therewith and disengagement therefrom by axial movement of said plug, said plug being contained in said cavity in a manner permitting movement over a limited path in the axial direction of said cavity, at one end of which path said plug abuts said valve seat and closes said orifice of said bore, said magnet being magnetized in said axial direction;

first and second windings (3,4) respectively located in said first and second cup cores (1,2), surrounding the respective re-entrant pole portions of said cores and electrically connected together in circuit so that energization of said circuit with current flow in either direction will produce like magnetic poles at said end faces of the respective re-entrant pole portions of said cores;

means for applying a pulse of current, selectively in either direction, by said circuit, to said windings (3,4), and a ferromagnetic ring (5) having its periphery in contact with the rim portion of at least one of said cup cores (1,2) and extending inwards across said cavity, at a location axially intermediate of said end faces of said re-entrant pole portions of said cores, to such an extent as to provide an inner aperture of said ring, of which the inner surface is closely adjacent to the periphery of said plug, for completing a magnetic circuit path for said permanent magnet of said plug when said plug is at either end of its axial path of movement in said cavity and for at least assisting in constraining said plug to move only axially in said cavity.

2. An electromagnetic valve as defined in claim 1, in which said surface of said valve seat and said closure surface of said valve plug are both spherical.

3. An electromagnetic valve as defined in claim 1 or claim 2, in which said permanent magnet is cylindrical in shape.

4. An electromagnetic valve as defined in claim 1 or claim 2, in which said current pulse applying means includes means for applying a braking pulse to at least one of said coils during the movement of said permanent magnet in the last half of its path of movement.

5. An electromagnetic valve as defined in claim 1 or claim 2, in which said valve seat is formed on a tubular member adjustably affixed in said bore for setting the opening action characteristics of said valve.

6. An electromagnetic valve as defined in claim 1 or claim 2, in which a thin plate (7) of nonmagnetic material is provided on said end face of said re-entrant pole portion of said first cup core (1) for limiting the axial path of travel of said valve plug.

7. A magnetic valve as defined in claim 1 or claim 2, in which said at least one duct connection (9,10) passes through the periphery of said cavity on the same side of said ferromagnetic ring (5) as the bottom of said second cup core (2).

8. A magnetic valve as defined in claim 7, in which two said duct connections (9,10) in addition to said bore are provided for passing a flow of fluid through said cavity which can be tapped by the opening of the valve.

9. A valve as defined in claim 1 in which said closure surface of said valve plug is spherical.

* * * * *